Figure 1:
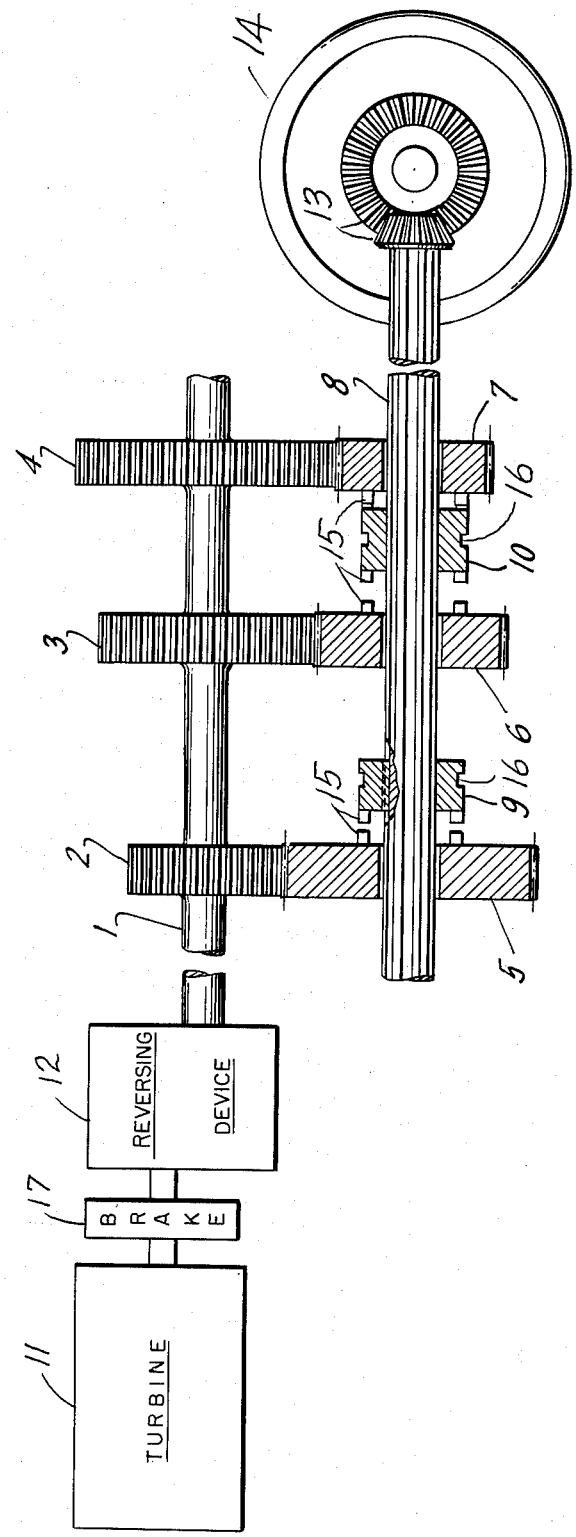

Dec. 20, 1955    L. SAIVES    2,727,602
REDUCTION GEAR FOR GAS TURBINE DRIVEN VEHICLE
Filed April 25, 1951

United States Patent Office 2,727,602
Patented Dec. 20, 1955

2,727,602
REDUCTION GEAR FOR GAS TURBINE DRIVEN VEHICLE

Léon Saives, Billancourt, France, assignor to Regie National des Usines Renault, Billancourt, France Application April 25, 1951, Serial No. 222,845

Claims priority, application France May 24, 1950

3 Claims. (Cl. 192—4)

This invention relates to a road or rail vehicle having a gas turbine or turbines, in which the gas may in particular be supplied by one or more generators having free pistons, the transmission being obtained mechanically or hydro-mechanically. The torque furnished by a turbine of constant induction varies with the speed thereof. It has a maximum value for a speed equal to approximately half that of the racing speed of the turbine. It is zero when the turbine is stopped and when it is driven at racing speed. It is, therefore, possible to obtain variable torques on the shaft of a turbine, depending on the range of speeds utilized. In order to maintain a good efficiency for all rates of utilization, it is hardly possible to obtain a very high ratio between the starting torque and that of maximum speed. However, if a widespread scale of torques is required for the purposes intended, it is necessary to be able to change the ratio between the turbine and the driving wheels.

An ordinary change-speed gear of current type which is manageable while running must comprise a clutch pedal and synchronization systems as well as safety devices to prevent the racing of the turbine while the speeds are being changed. Such a device, in the case of high power, would be of large dimensions and very complicated. It is therefore proposed to use a simpler system in cases where economy is of the essence, as in railroad locomotives.

The invention consists in providing, at any point in the transmission of a vehicle of the type mentioned above, a plurality of speed reducers adapted to be operated when the vehicle is at rest.

The accompanying drawing shows, by way of example, one form of construction of such an arrangement designed, in this particular case, for three different reductions.

A driving shaft 1 is operatively connected to a turbine 11 through a reversing device 12. The shaft 1 has keyed on it three pinions 2, 3, 4 of different diameters meshing with three gear wheels 5, 6, 7 mounted loosely but non-slidably on a driven shaft 8. The shaft 8 is operatively connected to the driven portion of the vehicle as illustrated schematically by bevel gear 13 and wheel 14. Sleeves 9 and 10 disposed in the spaces between the gear wheels 5, 6 and 7 are splined on the shaft so as to rotate therewith but be axially slidable thereon. The sleeves 9 and 10 and gears 5, 6 and 7 carry interengageable tooth or gear elements 15 and the sleeves are provided with annular grooves 16 for sliding the sleeves, when the vehicle is stopped and while the turbine is prevented from racing, to engage selectively with one or another of the gears 5, 6 and 7. The gear with which one of the sleeves 9 or 10 is engaged is thereby put in driving connection with the shaft 8.

In order to avoid possible racing of the turbine or turbines during the change-down, use may be made during that operation of any system of complete or partial braking or complete or partial cessation of the feeding of the turbine or turbines, such as those described in my co-pending patent applications Serial Nos. 222,842 and 222,843 filed April 25, 1951, the latter of which has become abandoned.

For this purpose a brake 17 is shown on the driving shaft, it being understood that said brake is suitably controlled as is disclosed in said applications.

I claim:

1. In a vehicle having a gas turbine power means, a driving shaft operatively connected to the turbine, a driven shaft parallel to the driving shaft and operatively connected to the driven portion of the vehicle, a set of gear wheels of different diameters mounted on one of said shafts and an equal number of spaced gear wheels mounted loosely but non-slidably on the other of said shafts, and in constant engagement with said first-named set of gear wheels, sleeves disposed in the spaces between said loosely mounted gear wheels driven by the respective shaft but slidable thereover between adjacent gear wheels, auxiliary gear elements carried respectively by the loose gear wheels and the slidable sleeves, means for preventing the turbine from racing during gear shifting, and means operable when the vehicle is stopped and while said turbine is prevented from racing for sliding one of said sleeves to engage its auxiliary gear elements with the auxiliary gear elements of an adjacent loose gear wheel, thereby engaging said wheel with said last-named shaft to place it in driving engagement with the other of said shafts.

2. In a mechanism for transmission of power as defined in claim 1, the shaft carrying the gear wheels mounted loosely thereon is provided at its periphery with longitudinal grooves and the sleeves rotatable with said shaft but slidable along it comprise longitudinal inner projections for sliding along said grooves.

3. In a vehicle having a gas turbine power means, a driving shaft operatively connected to the turbine, a driven shaft parallel to the driving shaft and operatively connected to the driven portion of the vehicle, a set of gear wheels of different diameters mounted on one of said shafts and an equal number of spaced independent gear wheels mounted loosely but non-slidably on the other of said shafts, and in constant engagement with said first-named set of gear wheels, sleeves disposed in the spaces between said loosely mounted gear wheels driven by the respective shaft but slidable thereover between adjacent gear wheels, auxiliary gear elements carried respectively by the loose gear wheels and the slidable sleeves, brake means directly upon the driving shaft for preventing the turbine from racing during gear shifting, and means operable when the vehicle is stopped and while said turbine is prevented from racing for sliding one of said sleeves to engage its auxiliary gear elements with the auxiliary gear elements of an adjacent loose gear wheel, thereby engaging said wheel with said last-named shaft to place it in driving engagement with the other of said shafts.

References Cited in the file of this patent

UNITED STATES PATENTS

| | | |
|---|---|---|
| 755,504 | Laur et al. | Mar. 22, 1904 |
| 841,109 | Brawley-Moore | Jan. 15, 1907 |
| 928,240 | Barnes | July 20, 1909 |
| 972,144 | Allen | Oct. 11, 1910 |
| 1,230,896 | Haupt | June 26, 1917 |
| 2,084,219 | Salerni | June 15, 1937 |
| 2,467,513 | Welsh | Apr. 19, 1949 |
| 2,512,856 | Fisk | June 27, 1950 |